(12) United States Patent
Hikmet et al.

(10) Patent No.: US 12,330,366 B2
(45) Date of Patent: Jun. 17, 2025

(54) 3D PRINTING OF A REFLECTOR USING POLYMER FILLED WITH METAL COATED GLASS OR MICA PARTICLES AND REFLECTOR OBTAINABLE THEREBY

(71) Applicant: SIGNIFY HOLDING B.V., Eindhoven (NL)

(72) Inventors: Rifat Ata Mustafa Hikmet, Eindhoven (NL); Loes Johanna Mathilda Koopmans, Soerendonk (NL); Stefan Willi Julius Gruhlke, Baesweiler (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 1533 days.

(21) Appl. No.: 16/613,265

(22) PCT Filed: May 7, 2018

(86) PCT No.: PCT/EP2018/061689
§ 371 (c)(1),
(2) Date: Nov. 13, 2019

(87) PCT Pub. No.: WO2018/210602
PCT Pub. Date: Nov. 22, 2018

(65) Prior Publication Data
US 2020/0139616 A1    May 7, 2020

(30) Foreign Application Priority Data

May 15, 2017    (EP) .................................. 17170997

(51) Int. Cl.
*B29C 64/118*    (2017.01)
*B29C 64/00*    (2017.01)
(Continued)

(52) U.S. Cl.
CPC ............ *B29C 64/118* (2017.08); *B29C 64/00* (2017.08); *B33Y 10/00* (2014.12); *B33Y 70/10* (2020.01);
(Continued)

(58) Field of Classification Search
CPC ....... F21V 7/24; B29C 70/585; B29C 64/118; B29C 64/00; B33Y 10/00; B33Y 70/10;
(Continued)

(56) References Cited

U.S. PATENT DOCUMENTS

2001/0011779 A1    8/2001   Stover
2013/0306998 A1*   11/2013  Ulasyuk ............. C09K 11/7774
                                                        257/88
(Continued)

FOREIGN PATENT DOCUMENTS

CN    105014963 A    11/2015
CN    105121071 A    12/2015
(Continued)

OTHER PUBLICATIONS

Laura G. Menendez, etc., 3D Printed 20/30-GHz Dual-Band Offset Stepped-Reflector Antenna, Aug. 31, 2015, IEEE Xplore, 9th European Conference on Antennas and Propagation, 1-2 (Year: 2015).*
(Continued)

*Primary Examiner* — Monica A Huson
*Assistant Examiner* — Kelsey C Grace

(57) ABSTRACT

The invention provides a method for 3D printing a 3D item (10), the method comprising providing a filament (320) of 3D printable material (201) and printing during a printing stage said 3D printable material (201), to provide said 3D item (10) comprising 3D printed material (202), wherein the 3D printable material (201) further comprises particles (410), wherein the particles (410) comprise one or more of glass and mica, wherein the particles (410) have a coating (Continued)

(412), wherein the coating comprises one or more of a metal coating and a metal oxide coating, and wherein the particles (410) have a longest dimension (A1) having an longest dimension length (L1) selected from the range of 10 μm-2 mm, and wherein the particles have an aspect ratio of at least 10.

8 Claims, 5 Drawing Sheets

(51) Int. Cl.
  *B33Y 10/00*  (2015.01)
  *B33Y 70/10*  (2020.01)
  *B33Y 80/00*  (2015.01)
  *F21V 7/24*  (2018.01)
  *B29K 101/12*  (2006.01)
  *B29K 505/02*  (2006.01)
  *B29K 509/08*  (2006.01)
  *B29K 509/10*  (2006.01)
  *B29L 11/00*  (2006.01)

(52) U.S. Cl.
  CPC ............... *B33Y 80/00* (2014.12); *F21V 7/24* (2018.02); *B29K 2101/12* (2013.01); *B29K 2505/02* (2013.01); *B29K 2509/08* (2013.01); *B29K 2509/10* (2013.01); *B29L 2011/0083* (2013.01)

(58) Field of Classification Search
  CPC ............... B33Y 80/00; B29K 2505/02; B29K 2509/08; B29K 2101/12; B29K 2509/10; B29L 2011/0083
  See application file for complete search history.

(56) References Cited

U.S. PATENT DOCUMENTS

2015/0080495 A1    3/2015  Heikkila
2017/0321037 A1*  11/2017  Mason ................ C08K 7/20

FOREIGN PATENT DOCUMENTS

| DE | 102016217348 A1 | 3/2017 |
| JP | 2017538852 A | 12/2017 |
| JP | 2018528569 A | 9/2018 |
| WO | 9914620 A1 | 3/1999 |
| WO | 1999014620 A1 | 3/1999 |
| WO | 2016083797 A1 | 6/2016 |
| WO | 2017001259 A1 | 1/2017 |

OTHER PUBLICATIONS

M. Janecek, "Reflectvity Spectra for Commonly Used Reflectors", Mar. 12, 2012, IEEE Transactions on Nuclear Science, vol. 59 Issue 3, p. 490-497 (Year: 2012).*
Reflectivity Spectra for Commonly Used Reflectors (Year: 2012).*

* cited by examiner

3D PRINTING OF A REFLECTOR USING POLYMER FILLED WITH METAL COATED GLASS OR MICA PARTICLES AND REFLECTOR OBTAINABLE THEREBY

CROSS-REFERENCE TO PRIOR APPLICATIONS

This application is the U.S. National Phase application under 35 U.S.C. § 371 of International Application No. PCT/EP2018/061689, filed on May 7, 2018, which claims the benefit of United European Patent Application No. 17170997.5, filed on May 15, 2017. These applications are hereby incorporated by reference herein.

FIELD OF THE INVENTION

The invention relates to a method for manufacturing a reflector by 3D printing. The invention also relates to the 3D (printed) reflector obtainable with said method. Further, the invention relates to a lighting system including such 3D (printed) reflector. Yet further, the invention also relates to a 3D printable material (for use in such method).

BACKGROUND OF THE INVENTION

The use of glitter in a matrix material is known in the art. US2001/0011779, for instance, describes methods and apparatuses for the manufacture of coextruded polymeric multilayer optical films. The multilayer optical films have an ordered arrangement of layers of two or more materials having particular layer thicknesses and a prescribed layer thickness gradient throughout the multilayer optical stack. The methods and apparatuses described allow improved control over individual layer thicknesses, layer thickness gradients, indices of refraction, interlayer adhesion, and surface characteristics of the optical films. The methods and apparatuses described are useful for making interference polarizers, mirrors, and colored films that are optically effective over diverse portions of the ultraviolet, visible, and infrared spectra.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

Incorporation of specular reflecting elements in 3D prints is interesting for creating a wide range of decorative effects. On the other hand, specular reflecting 3D prints can be used in functional reflector designs for LED luminaires. However, specular (mirror) effects are hard to make in FDM 3D printing technology. Experiments using aluminum flakes incorporated in the printing filament yields a silverish/grey material with a low reflectivity. Further, one may of course include non-3D printed optical elements in the 3D printed item. However, this may complicate product and does not allow using the 3D printing freedom and opportunities to be applied to the optical element. Further, also other optical effects may be desirable, like a sparkling or metallic appearance.

Hence, it is an aspect of the invention to provide an alternative optical element, especially a (specular) reflector, which preferably further at least partly obviates one or more of above-described drawbacks. Yet further, it is an aspect of the invention to provide an alternative lighting system comprising such optical element, especially a reflector, which preferably further at least partly obviates one or more of above-described drawbacks. Further, it is an aspect of the invention to provide a method for providing such optical element, especially a reflector, which preferably further at least partly obviates one or more of above-described drawbacks. Yet further, it is an aspect to provide an alternative 3D printable material. The present invention may have as object to overcome or ameliorate at least one of the disadvantages of the prior art, or to provide a useful alternative.

Therefore, in a first aspect the invention provides a method for manufacturing a reflector by 3D printing, the method comprising providing a filament of 3D printable material and printing during a printing stage said 3D printable material (on a substrate), to provide said reflector comprising 3D printed material, wherein the 3D printable material further comprises particles, wherein the particles comprise one or more of glass and mica, wherein the particles in specific embodiments having a coating, wherein the coating comprises one or more of a metal coating and a metal oxide coating, and wherein the particles especially have a longest dimension (A1) having an longest dimension length (L1) selected from the range of 10 μm-2 mm, and wherein the particles especially have an aspect ratio of at least 10, wherein the coating comprises a light reflective material, and wherein the 3D printable material comprises a polymeric material which is transparent to light.

The herein described method provides 3D printed reflector. Hence, the invention also provides in a further aspect a 3D printed reflector obtainable with the herein described method. Hence, in yet a further aspect the invention also provides a 3D printed reflector comprising 3D printed material, wherein the 3D printed material comprises a thermoplastic material comprises particles, wherein the particles comprise one or more of glass and mica, wherein the particles especially have a coating, wherein in specific embodiments the coating comprises one or more of a metal coating and a metal oxide coating, and wherein the particles especially have a longest dimension (A1) having an longest dimension length (L1) selected from the range of 10 μm-2 mm, and wherein in specific embodiments the particles have an aspect ratio of at least 10. As indicated above, such 3D printed reflector may be obtained with the herein described method.

Yet further, in an aspect the invention provides a 3D printable material comprising an (thermoplastic) polymer with particles embedded therein, wherein the particles comprise one or more of glass and mica, wherein the particles especially have a coating, wherein in embodiments the coating comprises one or more of a metal coating and a metal oxide coating. Especially, the particles have a longest dimension having an longest dimension length selected from the range of 10 μm-2 mm, and wherein the particles have an aspect ratio of at least 10. Different particles may have different dimensions. Hence, especially the dimensions indicated herein refer to an average of the dimension, especially an. average over the total number of particles (see also below). Hence, in embodiments the 3D printable material comprises particulate material embedded therein.

With such method it is amongst others possible to provide a reflective surface, especially a specular reflective mirror, on a 3D printed item or in fact integrated with such 3D printed item. Hence, the invention allows (specularly) reflecting (decorative) surfaces with metallic appearance on 3D printed objects. With such method, it is also possible to provide products with a sparkling or metallic like surface. A further feature of the invention is that the 3D printed products thus obtained have such an appearance, that the visibility of the rough ribbed surface that may be obtained with 3D printing, especially FDM printing, seems to be suppressed, due to the mirror like or sparkling effect.

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc. Especially, the printable material per se is light transmissive, more especially optically transparent. PPMA, PC, amorphous PET, PS and co-polyesters of two or more thereof are suitable polymers. Hence, especially polymeric materials may be applied that are at least partially transmissive for visible light. For instance, the polymeric material is transparent to light (assuming the particles are not (yet) available).

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

Specific examples of materials that can be used are transparent materials can e.g. be selected from the group consisting of, polycarbonate (PC), amorphous polyamides (PA), amorphous PET, polystyrene (PS), PET, PMMA, etc., and copolymers of two or more thereof (such as copolyesters). They may also contain dyes which may optionally be luminescent to obtain enhanced effects.

The printable material is especially printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby. See further also below were specific (separate) substrates are discussed.

In yet further embodiments, in addition to the particles described herein for their reflective function, the layer may also include other type of particles. The weight percentage of such particles in the layer is especially less than 20 wt. %, such as less than 10 wt. % in order to maintain the desired reflectivity.

As indicated above, the 3D printable material, and thus also the 3D printed material comprises particulate material. The particulate material comprises the mica particles and/or the glass particles. The particulate may be polydisperse.

As indicated above, the particles have an aspect ratio of larger than 1, especially at least 2, such as at least 5. However, even more especially the aspect ratio is at least 10, such as even more especially at least 20, like in the range of 10-10,000. This implies that there is a longest dimension, with has a longest dimension length, which has together with a thickness an aspect ratio (length/thickness) of at least 10.

Therefore, in embodiments particles are used which have a longest dimension (A1) having a longest dimension length (L1), and a minor axis (A2) having a minor axis length (L2), wherein the longest dimension length (L1) and the minor axis length (L2) have a first aspect ratio larger than 1, such as at least 2, like in the range of 5-10,000. Especially, as indicated above, the aspect ratio is at least 10.

Especially, the aspect ratios indicated herein, or the dimensions, such as the longest dimension, etc., indicated herein, refer to an average over the total number of particles. Hence, the term "in average" especially refers to a number average. As indicated above, the particulate may be polydisperse.

Especially, the particles have a longest axis or longest dimension and a shortest axis or minor axis, which have an aspect ratio of larger than 1, especially at least 2, such as at least 5, such as in the range of 5-10,000, like even more especially at least 10, such as in the range of 10-10,000, like at least 20, such as in the range of 20-1,000.

In embodiments, the particles have longest dimension lengths (L1) selected from the range of 10 µm-10 mm, such as 20 µm-5 mm, especially 50 µm-2 mm. even more especially selected from the range of 20 µm-1 mm. Especially, the particles have a longest dimension (A1) having an longest dimension length (L1) selected from the range of 10 µm-2 mm, even more especially selected from the range of 20 µm-1 mm.

The particles may have a flake like structure, i.e. particles having a maximum width and a maximum length substantially larger than a maximum thickness, such as a first aspect ratio of the maximum length and maximum thickness of especially at least 5, like at least 10, such as in the range of 10-10,000, and/or a second aspect ratio of the maximum width and the maximum height of especially at least 5, such as in the range of 10-10,000.

Further, in embodiments the particles may have a third aspect ratio of the maximum length and maximum width, which is especially larger than 1, such as more especially at least 2, such as at least 5, like at least 10, such as in the range of 10-10,000 (see further also below). Hence, in embodiments the particles are flakes.

The aspect ratios, as indicted above, refer to the particles including an optional coating of the particles. The phrase "coating of the particles" especially refers to a coating on an individual particle, i.e. a coating enclosing a single particle. Hence, also the term "particle coating" may be used. The coating may enclose the particle entirely or only a part of the particle. The particles of a subset of the total number of particles may include a particle coating and anther subset of the total number of particles may not include a particle coating. Further, the aspect ratios indicated above may refer to a plurality of particles having different aspect ratios. Hence, the particles may be substantially identical, but the particles in the coating may also mutually differ, such as two or more subsets of particles, wherein within the subsets the particles are substantially identical.

To define the longest dimension and the minor axis or minor axes for the particles, herein the axes of a (virtual) rectangular parallelepiped with the smallest volume that encloses the particle may be used. The main and minor axes are defined perpendicular to the faces of the rectangular parallelepiped, the longest dimension having a longest dimension length (L1), a minor axis with a minor axis length (L2) and another or further (orthogonal axis) having a further axis length (L3). Hence, the longest dimension may especially relate to a length of the particles, the minor axis may especially relate to a thickness or height of the particles, and the further axis may especially refer to a width of the particles.

Especially, L1>L2, further, especially L3>L2. The ratios given herein for L1/L2 may also apply to a ratio of L3/L2. L1 and L3 may be the same or may differ, but are in specific embodiments each individually especially at least 5 times larger than L2, such as at least 10 times larger than L2. Further, the dimensions herein given for the longest dimension length may thus also apply for the length of the further axis, though—as indicated above—the length of these axis may be chosen individually. With the definition of the virtual) rectangular parallelepiped, and the herein indicated dimensions, essentially flat particles, like flakes, are defined.

Therefore, in embodiments the longest dimension, the minor axis, and a further axis, define a rectangular parallelepiped with a smallest volume that encloses the particle, wherein the further axis has a further axis length (L3), wherein further axis length (L3) and the minor axis length (L2) have a second aspect ratio (L3/L2) of at least 5, such as at least 10.

Further, the particles may mutually differ. For instance, the particles may have a distribution of the sizes of one or more of the longest dimension, the minor axis (and the further axis). Therefore, in average, the particles will have dimensions as described herein. For instance, at least 50 wt. % of the particles comply with the herein indicated dimensions (including ratios), such as at least 75 wt. %, like at least 85 wt. %. As known in the art, the particles may also have effective diameters indicated with d50. Such diameters may thus vary, as there may be a distribution of particle sizes.

Hence, in embodiments at least 50 wt. % of the particles, such as at least 75 wt. %, like at least 85 wt. % has a longest dimension with a length (L1) selected from the range of 10 µm-10 mm, such as 20 µm-5 mm, especially 50 µm-2 mm. even more especially selected from the range of 20 µm-2 mm.

Yet further, in embodiments at least 50 wt. % of the particles, such as at least 75 wt. %, like at least 85 wt. % has a minor axis length (L2) selected from the range of 5 nm-10 µm, like at least 20 nm, such as in the range of 20-500 nm.

Yet further, in embodiments at least 50 wt. % of the particles, such as at least 75 wt. %, like at least 85 wt. % has a further axis with a further axis length (L3) selected from the range of 1-500 µm, such as 2-100 µm.

In yet further embodiments, for at least 50 wt. % of the particles, such as at least 75 wt. %, like at least 85 wt. %, apply all these conditions for L1, L2 and L3 for each particle (of the at least 50 wt. %).

In specific embodiments, a mass median weight (or more) of the particles has a longest dimension with a length (L1) selected from the range of 1 µm-10 mm, such as 5 µm-5 mm, especially 10 µm-2 mm. even more especially selected from the range of 20 µm-1 mm. In yet further specific embodiments, a mass median weight (or more) of the particles has a minor axis length (L2) selected from the range of 5 nm-10 µm, like at least 20 nm, such as in the range of 20-500 nm. In further specific embodiments, a mass median weight (or more) of the particles has a further axis with a further axis length (L3) selected from the range of 1-500 µm, such as 2-100 µm. In yet further embodiments, a mass median weight (or more) of the particles comply with all these conditions for L1, L2 and L3.

For particles that have a shape, like a flake-like shape that is essentially cylindrical shape, the longest dimension and further axis may essentially have the same dimensions, i.e. L1≈L3.

The flakes, as mentioned herein, may have any shape. An example of particles with a high aspect ratio are cornflake particles. Cornflake particles are high aspect ratio flakes with ragged edges and a cornflake-like appearance. Cornflake particles may have aspect ratios in the range of 10-1.000.

In specific embodiments, the particles may irregularly be shaped.

In specific embodiments, the particles may comprise pieces of broken glass (having the herein defined dimensions)

The particles can be mica particles or glass particles, especially mica particles or glass particles with a coating. In specific embodiments, the particles comprise glass particles having a coating. It appears that such particles have better properties, such as in terms of reflection, especially specular reflection, than metal flakes. Such particles tend to provide a relative higher diffuse reflection.

However, especially the glass or mica particles, especially the glass particles, may have a coating comprises one or more of a metal coating and a metal oxide coating. Metal coatings may e.g. be selected from aluminum, silver, gold, etcetera. Metal oxide coatings may e.g. include tin oxide, titanium oxide, etcetera.

Therefore, in specific embodiments the particles comprise glass flakes. In further specific embodiments, the particles comprise silver or aluminum coated glass particles. Aluminium coated glass may be preferred over silver coated glass because the corrosion resistance of aluminium is excellent and much better than silver. Aluminium has the ability to resist corrosion through the phenomenon of passivation.

In specific embodiments, also combinations of different type of particles may be used.

In specific embodiments, the 3D printable material (and thus 3D printed material) comprises one or more of polycarbonate (PC), (amorphous) polyethyleneteleptrhalate (PET), polymethylmethacrylate (PMMA), polystyrene (PS) etc., and copolymers, such as copolyesters, of two or more thereof.

In specific embodiments, the 3D printable material comprises up to 40 wt. %, relative to the total weight of the 3D printable material (including the particles). Even more especially, the 3D printable material comprises in the range of 0.5-10 wt. %, relative to the total weight of the 3D printable material of the particles, yet even more especially the 3D printable material comprises in the range of 1-5 wt. %, relative to the total weight of the 3D printable material of the particles. Hence, in embodiments the particles are available up to 40 wt. %, such as 0.5-10 wt. %, relative to the total weight of the 3D printable material (or printed material, see also below). With higher percentages, the 3D printable may be difficult to process, and with lower percentages the optical effects may be considered too small.

Therefore, specific embodiments, the 3D printed material comprises up to 40 wt. % of the particles, relative to the total weight of the 3D printed material. Even more especially, the 3D printed material comprises in the range of 0.5-10 wt. % of the particles, relative to the total weight of the 3D printed material, yet even more especially the 3D printed material comprises in the range of 1-5 wt. % of the particles, relative to the total weight of the 3D printed material (including the particles).

In specific embodiments, it is also possible to include colorants such as dyes as well as luminescent dyes to obtain enhanced effects.

Further, the invention relates to a software product that can be used to execute the method described herein.

The (with the herein described method) obtained 3D printed item may be functional per se. For instance, the 3D printed item may be a collimator. The 3D printed item is a reflector. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively or additionally, the functional component may comprise a thermal component (e.g. configured to cool or to heat an electrical component). Hence, the functional component may be configured to generate heat or to scavenge heat, etc.

In specific aspects however, the 3D printed item may be provided as reflector. In such embodiments, the substrate used has a shape of a reflector on which the layer has been provided first, and thereafter on the layer the 3D printed material has been provided. Therefore, the invention also provides a reflector comprising a reflective surface, especially a specular reflective surface, wherein the reflector comprises the 3D printed item as defined herein, and wherein at least part of the reflective surface is provided by the 3D printed item.

Therefore, in specific embodiments of the method of the invention, the substrate has the shape of a reflector with one or more of a curved face, a facetted face, and faces configured relative to each under an angle.

As indicated above, in embodiments the reflective surface comprises one or more of a curved face, a facetted face, and faces configured relative to each under an angle. In embodiments, the reflector is a collimator or a parabolic mirror. Hence, types of reflectors include but are not limited to ellipse shaped reflectors (e.g. for converging rays), parabola shaped reflectors (e.g. for making parallel rays), hyperbola-shaped reflectors (for diverging rays), etc.

The reflector may also be used in a lighting system. Hence, the invention provides in yet a further aspect a lighting system comprising (a) a light source configured to generate light source light and (b) a reflector as defined herein configured to (specularly) reflect at least part of said light source light.

Returning to the 3D printing process, a 3D printer may be used to provide the 3D printed item described herein. Therefore, in yet a further aspect the invention also provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
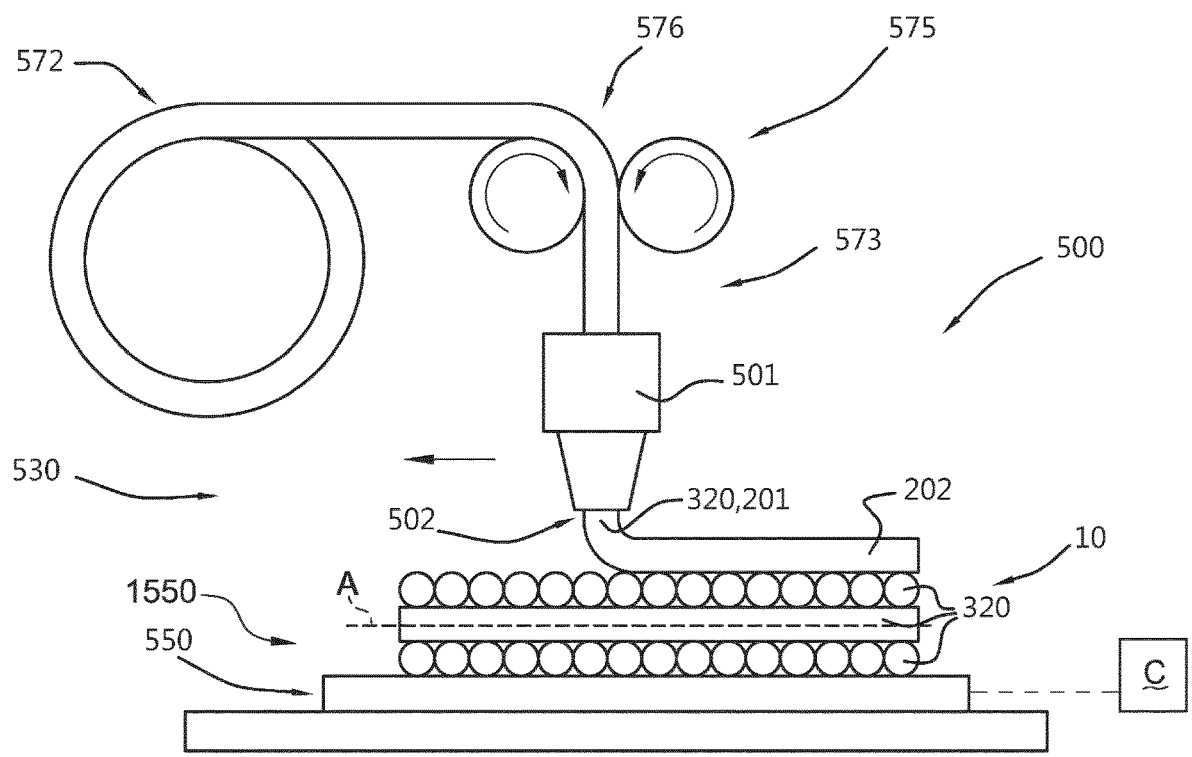
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
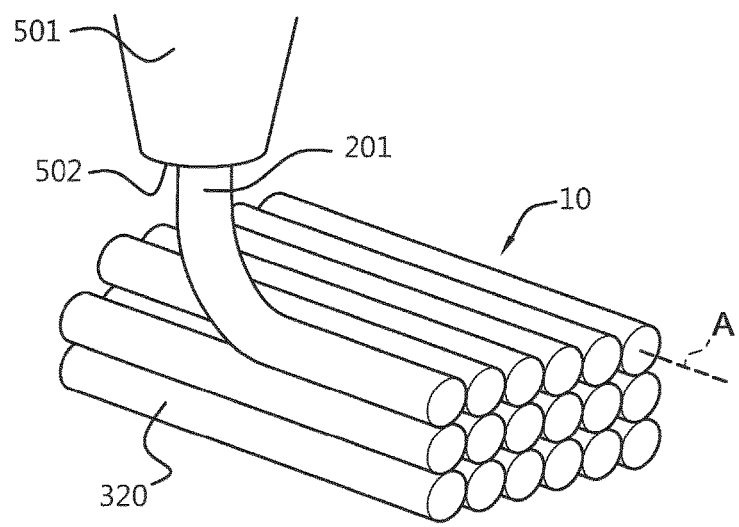

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Figure 2A:
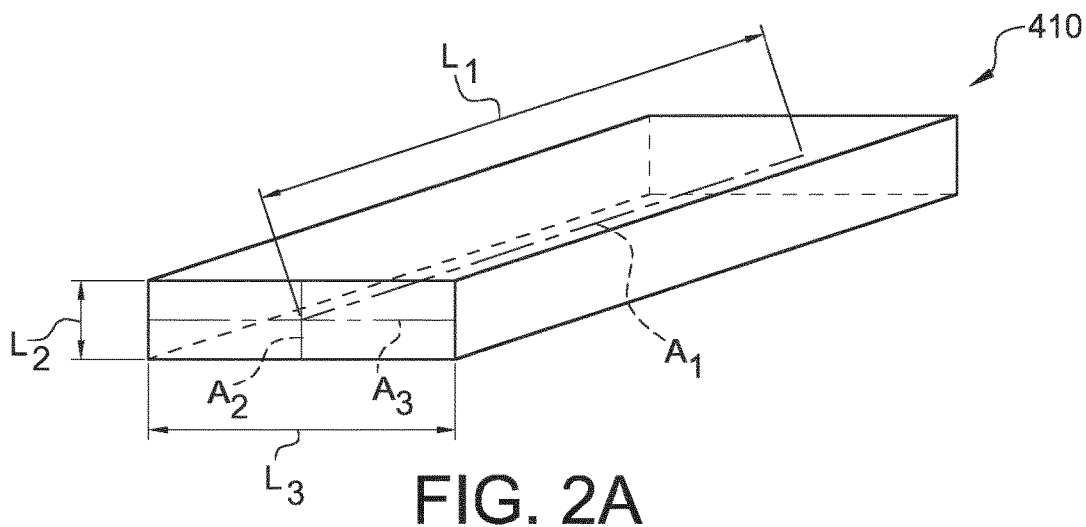
FIGS. 2a-2d schematically depict some aspects of the particles, such as flakes, that can be used herein.

FIGS. 2a-2d schematically depict some aspects of the particles 410. Some particles 410 have a longest dimension A1 having a longest dimension length L1 and a minor axis A2 having a minor axis length L2. As can be seen from the drawings, the longest dimension length L1 and the minor axis length L2 have a first aspect ratio larger than 1. FIG. 2a schematically depicts a particle 410 in 3D, with the particle 410 having a length, height and width, with the particle (or flake) essentially having an elongated shape. Hence, the particle may have a further (minor or main) axis, herein indicated as further axis A3. Essentially, the particles 410 are elongated thin particles, i.e. L2<L1, especially L2<<L1, and L2<L3, especially L2<<L3. L1 may e.g. be selected from the range of 1-500 μm; likewise L3 may be. L2 may e.g. be selected from the range of 0.1 μm-10 μm. Also L3 may e.g. be selected from the range of 0.1 μm-10 μm. However, L2 and/or L3 may also be longer, such as up to 5 mm, such as up to 1 mm, like up to 100 μm.

Figure 2B:
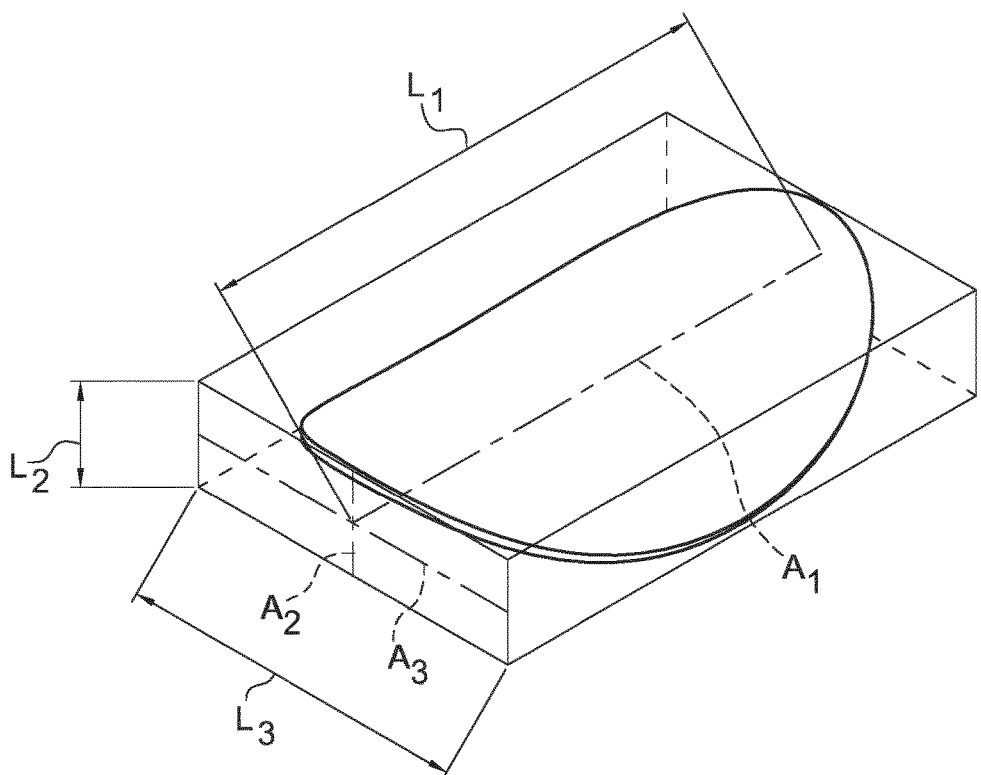

FIG. 2b schematically depicts a particle that has a less regular shape such as pieces of broken glass, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a longest dimension substantially longer than a minor axis or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume.

Figure 2C:
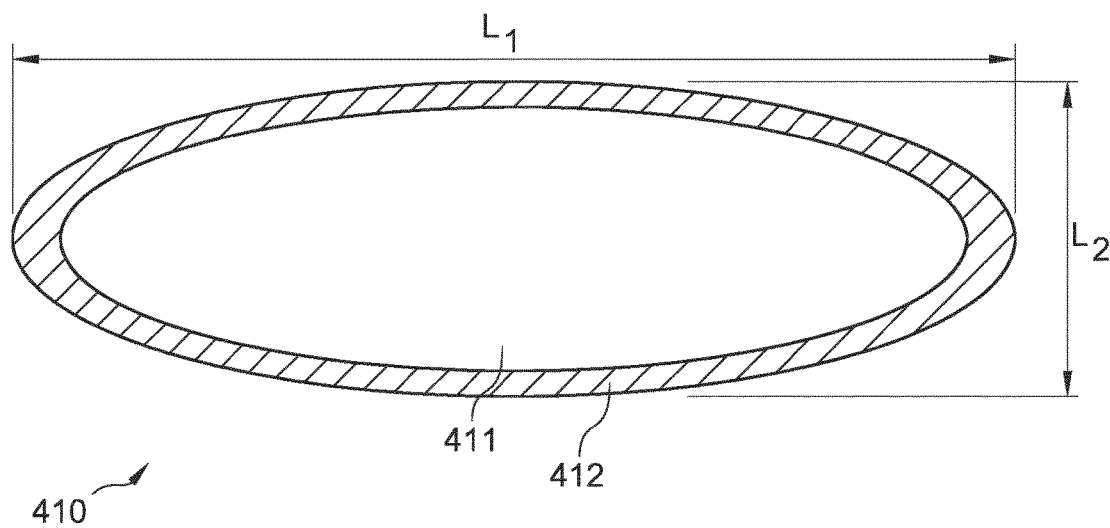

FIG. 2c schematically depicts in cross-sectional view a particle 410 including a coating 412. The coating comprises a light reflective material. For instance, the coating may comprise a (white) metal oxide. In other embodiments, the coating may essentially consist of a metal, such as an Ag coating. In other embodiments the coatings may only be on one or both of the large surfaces and not on the thin side surfaces of the particles. The light reflective material may preferably have a reflectivity of at least 80%. More preferably, light reflective material may have a reflectivity of at least 85%. Most preferably, light reflective material may have a reflectivity of at least 88% such as for example 90 or 95%. For instance, aluminium serves as a good reflector of visible light (approximately 92%).

Figure 2D:
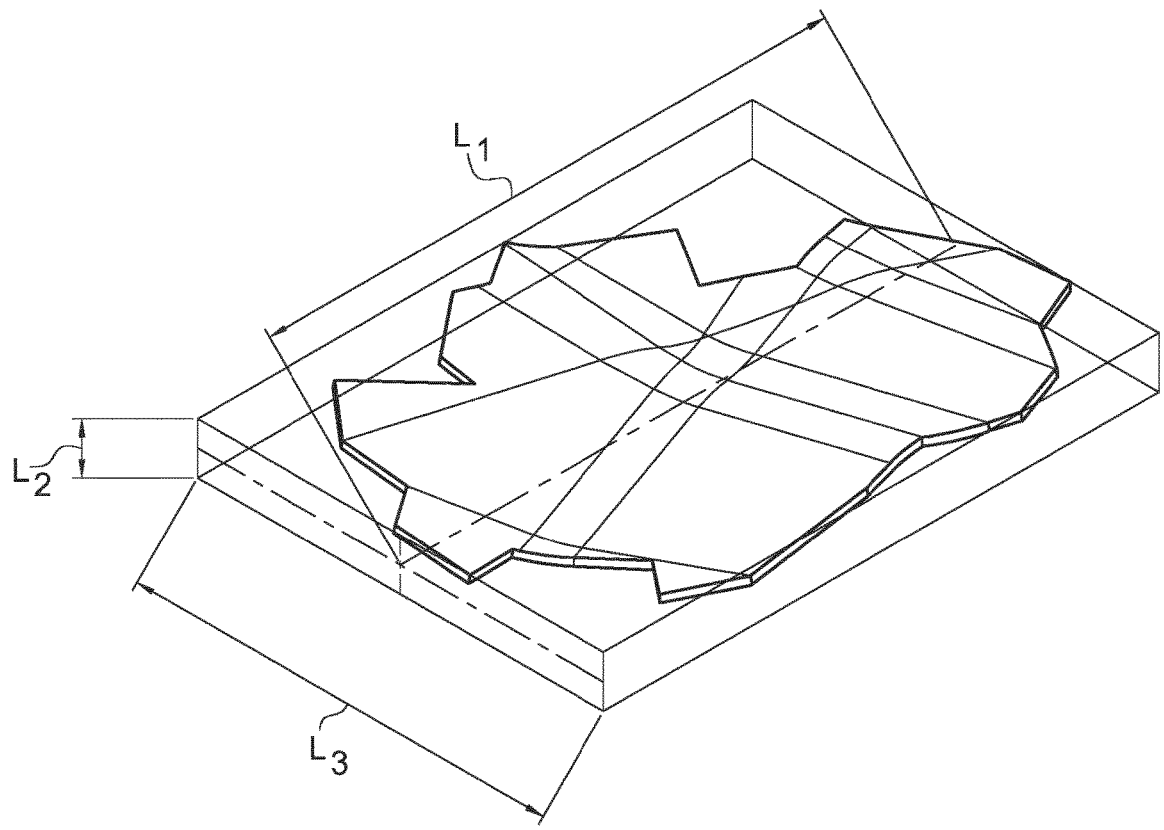

FIG. 2d schematically depicts a relatively irregularly shaped particle. The particulate material that is used may comprise e.g. small broken glass pieces. Hence, the particulate material that is embedded in the 3D printable material or is embedded in the 3D printed material may include a broad distribution of particles sizes.

Figure 3A:
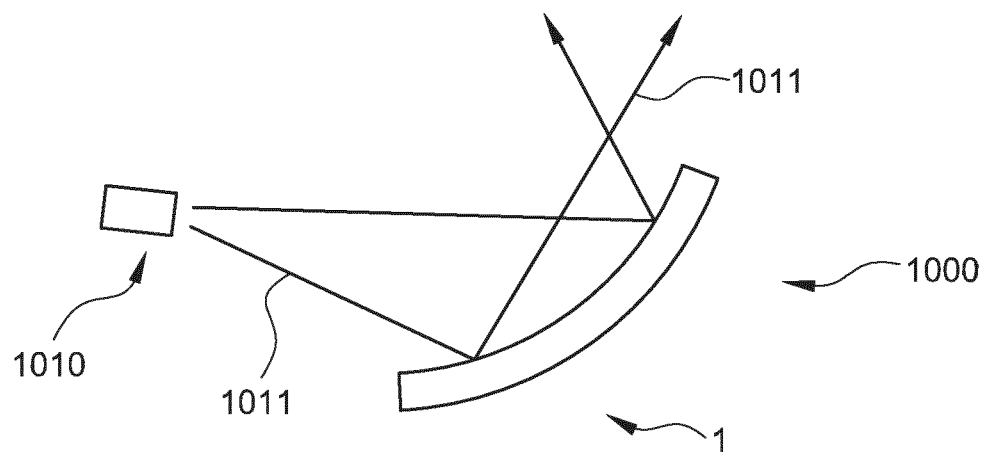
FIGS. 3a-3d schematically depict some applications, including 3D printed items.

FIG. 3a schematically depicts a lighting system 1000 comprising a) a light source 1010 configured to generate light source light 1011 and b) a reflector 1, such as defined above, configured to reflect at least part of said light source light 1011.

In yet another embodiment, the reflector shaped substrate(s) can produce reflectors with 10, 25 and 40 degrees full width half maximum. In an embodiment, the reflector shaped support may thus have the shape and smoothness of a smooth reflector (see e.g. FIG. 3b). In another embodiment, the reflector shaped table might have the shape and smoothness of a faceted reflector. The facets may have areas of larger than 16 mm$^2$, such as in the range of 16-1600 mm$^2$. However, the facets may also be smaller, such as in the range of 1-16 mm$^2$, or even smaller, such as in the range of 0.01-1 mm$^2$. Such fine facets or structures provide smoother beams.

Figure 3B:
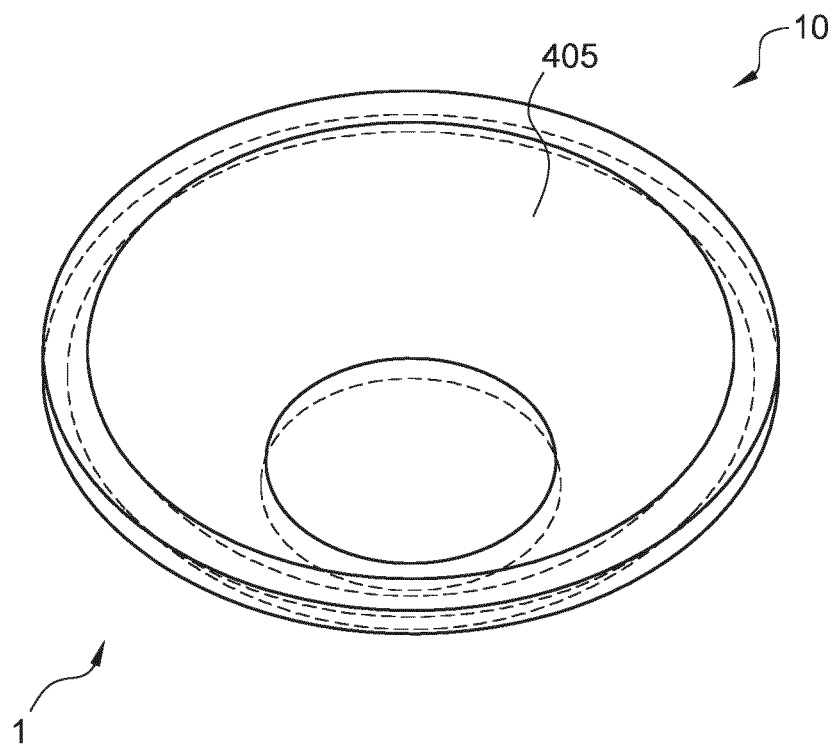
Figure 3C:
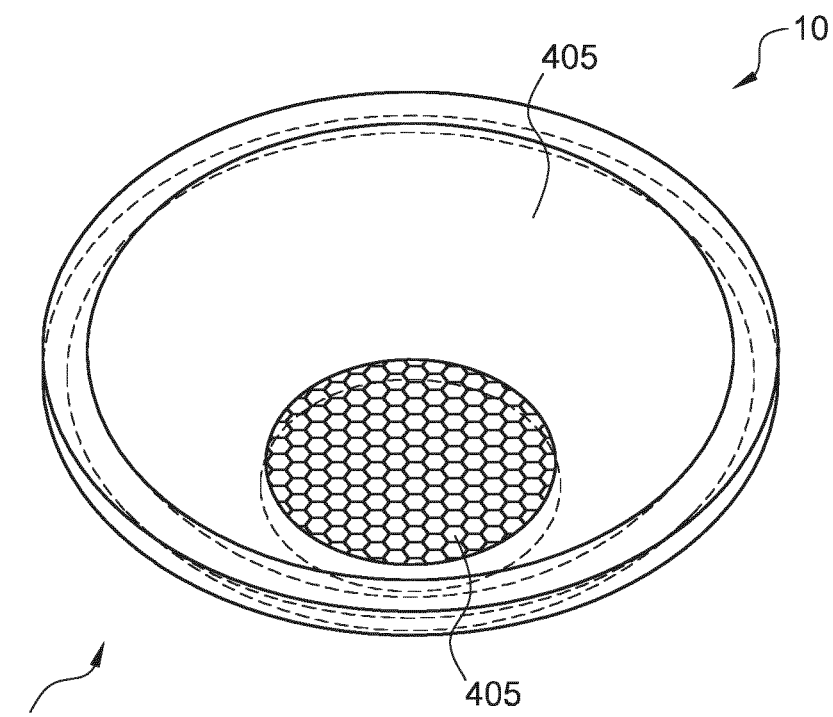

In yet another embodiment, we suggest a reflector shaped table which has a shape and smoothness of a spiral faceted reflector. The fine facets in a tight spiral are desired to achieve a smooth beam. In yet another embodiment, we suggest a reflector shaped table which has a shape and smoothness of a hybrid reflector. It comprises facets near the light source in order to obtain a beam without a "black hole" (see FIG. 3c). More remote from the light source, the reflector may not be facetted. In yet another embodiment, we suggest a reflector shaped table which has a shape and smoothness of an engineered structure including but not limited to including a "textured", "orange peel" and "stochastic" design. Hence, essentially any reflector 1 may include one or more 3D parts comprising the herein described 3D item 10 having reflective properties. Hence, parts of the reflectors 1 in FIGS. 3b-3c are 3D printed, and include the 3D item 10.

Figure 3D:
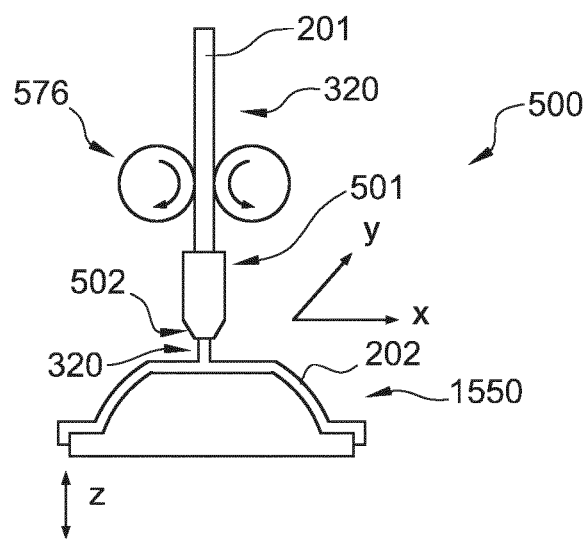

For printing lamps and luminaires, we suggest the use of a smooth reflector shape which is placed on the print platform. The particles can be applied by e.g. spray coating onto the smoot reflector shape. Subsequently, the printer can print on top of such a surface taking over aligned particles (FIG. 3d).

Here we suggest using glass flakes with a metal or a metal oxide coating. Such glass flakes show specular reflection and act as small mirrors. Here we suggest using glass flakes with a metal, metal oxide coating. For obtaining glitter effect the flakes have an aspect ratio (size/thickness) of 20 or larger. The average size of the flakes is in the range 20 μm-1 mm. The flakes can be brought into a polymer such as PC, PMMA, and PET at a concentration up to 40 wt %. The Host polymer is preferentially a transparent polymer. It is also possible to combine with dyes to maintain glittering effect without inducing scattering. In may also comprise a luminescent or absorbing dye.

Several examples were printed with PC as printable material with glass flakes embedded therein. The glass flakes had a silver coating, with a thickness of about 0.1 μm. The concentration of the particles was about 4 wt. % in the examples. The particles had particles sizes of 20, 60 and 100 μm, respectively, and thicknesses of about 1 μm. The products thus obtained had, though a silver coating was used, a golden appearance.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware.

The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for manufacturing a reflector by 3D printing, the method comprising providing a filament of 3D printable material and printing during a printing stage said 3D printable material, to provide said reflector comprising 3D printed material, wherein the 3D printable material further comprises particles, wherein the particles comprise one or more of glass and mica, wherein the particles have a coating, wherein the coating comprises one or more of a metal coating and a metal oxide coating, and wherein the particles have a longest dimension (A1) having an longest dimension length (L1) selected from the range of 10 μm-2 mm, and wherein the particles have an aspect ratio of at least 10, wherein the coating comprises a light reflective material, and wherein the 3D printable material comprises a polymeric material which is transparent to light to enable the particles to provide a diffuse reflection having a reflectivity of at least 85%.

2. The method according to claim 1, wherein the particles are flake-like having a longest dimension length (L1) selected from the range of 20 μm-1 mm and an aspect ratio of at least 20.

3. The method according to claim 1, wherein the particles comprise one or more of mica flakes and glass flakes.

4. The method according to claim 1, wherein the 3D printable material comprises up to 40 wt. %, relative to the total weight of the 3D printable material, of the particles.

5. The method according to claim 1, wherein the 3D printable material comprises in the range of 1-5 wt. %, relative to the total weight of the 3D printable material, of the particles.

6. The method according to claim 1, wherein the 3D printable material comprises one or more of polystyrene (PS), polycarbonate (PC), polyethyleneteleptalate (PET), polymethylmethacrylate (PMMA), and copolymers of two or more of these.

7. The method according to claim 1, wherein the particles comprise silver or aluminum coated mica or glass particles.

8. The method according to claim 1, the method comprising printing during the printing stage said 3D printable material on a substrate, wherein the substrate has the shape of a reflector with one or more of a curved face, a facetted face, and faces configured relative to each under an angle.

* * * * *